United States Patent [19]

Gebhardt

[11] 4,121,709
[45] Oct. 24, 1978

[54] STOW ROLLER TRAIN ARRANGEMENT

[76] Inventor: Richard Gebhardt, H. Thomastrasse 10, 6920 Sinsheim, Germany

[21] Appl. No.: 678,257

[22] Filed: Apr. 19, 1976

[30] Foreign Application Priority Data

Apr. 17, 1975 [DE] Fed. Rep. of Germany ....... 2517015

[51] Int. Cl.² .......................................... B65G 13/02
[52] U.S. Cl. .................................... 198/781; 198/791
[58] Field of Search ....................... 198/781, 789–791, 198/857

[56] References Cited

U.S. PATENT DOCUMENTS

| 2,712,377 | 7/1955 | Eggleston | 198/789 |
| 3,283,880 | 11/1966 | Cruzen | 198/789 |
| 3,425,341 | 2/1969 | McGinley | 198/791 |
| 3,718,248 | 2/1973 | Muller | 198/781 |
| 3,729,088 | 4/1973 | Vom Stein et al. | 198/781 |
| 3,848,727 | 11/1974 | Gebhardt | 198/781 |
| 3,905,470 | 9/1975 | Gebhardt | 198/781 |
| 3,939,962 | 2/1976 | Gebhardt | 198/781 |

Primary Examiner—Joseph E. Valenza
Attorney, Agent, or Firm—Craig & Antonelli

[57] ABSTRACT

A stow roller train arrangement which includes a plurality of rotatably mounted conveyor rollers extending transversely to the direction of conveyed articles with intermediate rollers being interposed between the conveyor rollers and the drive mechanism which intermediate rollers transmit a drive force to the conveyor rollers. A control device provided with a sensor extends in the path of movement of the articles being conveyed which control device selectively displaces the intermediate rollers into and out of engagement with the drive means in response to the sensor sensing the presence or absence of articles at the conveyor rollers. The drive transmission between at least one of the intermediate rollers and the drive device and the intermediate rollers and the conveyor rollers is a positive or direct drive transmission with a friction transmission being arranged between the other of the intermediate rollers and drive device and the intermediate rollers and conveyor rollers.

6 Claims, 4 Drawing Figures

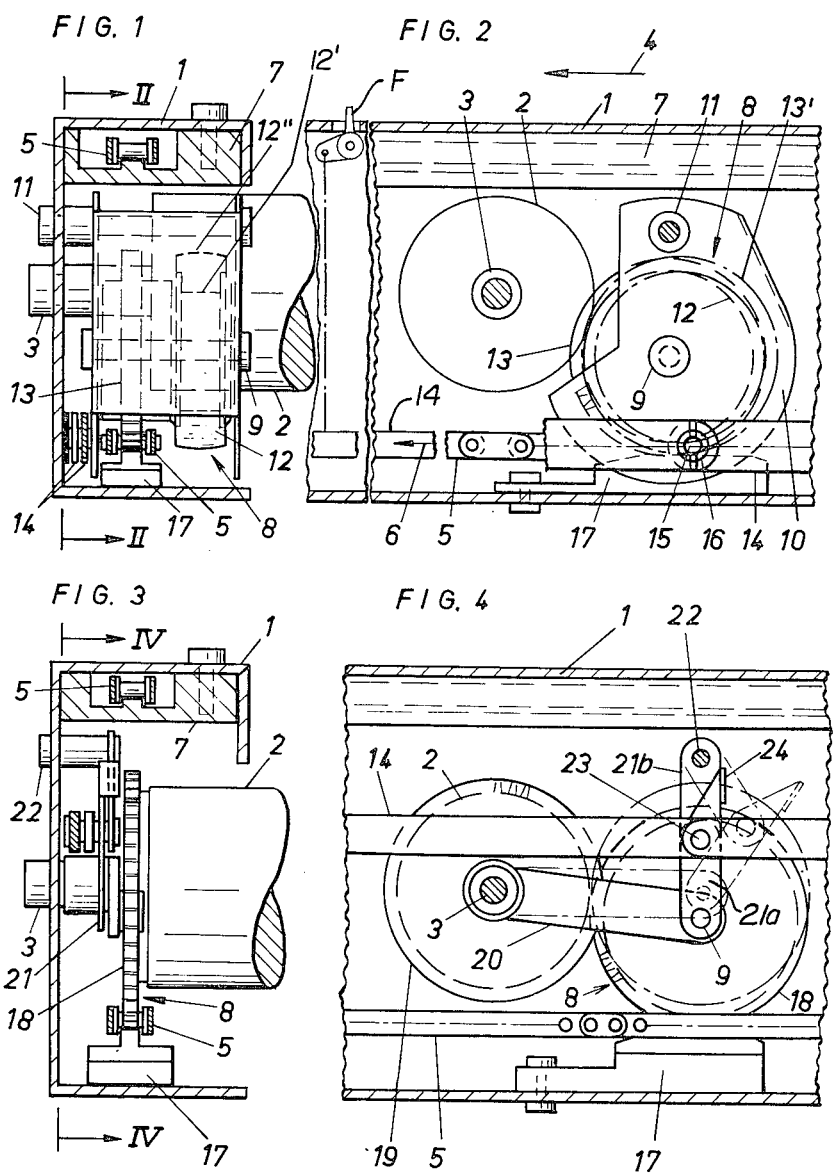

STOW ROLLER TRAIN ARRANGEMENT

The present invention relates to a transportation arrangement and, more particularly, to a stow roller train arrangement for transporting and stowing of individual articles, especially pallets, which includes a plurality of rotatable rollers disposed transversely to the direction of conveyance with a drive means and intermediate roller means being provided for transmitting a drive force from the drive means to the conveyor rollers and a control means having a sensor extending into the path of movement of the individual articles whereby the associated intermediate rollers are automatically selectively switched from a drive position to a disengaged position by virtue of the sensor sensing the presence or absence of articles at the conveyor rollers.

Stow roller trains having adjustable intermediate rollers have been proposed wherein the article conveyor rollers, intermediate rollers and drive means, in the form of a circulating belt, are provided with a substantially smooth surface so that the intermediate rollers are moved with force in a drive setting between the conveyor rollers and the drive means and are released from the drive setting only by expending a considerable force. In such proposed constructions, the transmission of force from the drive means to the respective conveyor rollers is effected exclusively by a frictional contact between the drive means and the conveyor rollers. By virtue of this arrangement, not only must materials or surfaces of the drive means, intermediate rollers, and conveyor rollers be such that strong frictional contact is ensured, but also, particularly in the acceleration phase or in the case of heavy articles, the drive means, intermediate rollers, and conveyor rollers must withstand the development of considerably large forces. Therefore, intermediate rollers which provide the drive connection between the drive means and the conveyor rollers are forcefully clamped in a wedge-shaped narrowing intermediate space between the conveyor rollers and the drive means. The greater the force to be transmitted the more deeply the intermediate rollers tend to swing in thereby resulting in supplementary deformations at the periphery of the intermediate rollers which are not inconsiderable. Additionally, for release of the intermediate rollers from the clamped position, considerable adjusting forces are required from the sensor and must be applied simultaneously for the intermediate rollers of a given roller group as the sensor senses and controls the group of rollers in response to the articles being conveyed. Since the adjusting forces are great, they may prevent the advance of one or more articles on the roller train. Furthermore, by virtue of the strong application of transmission forces and the resulting deformation of the material of the intermediate rollers and/or the drive means, abrasion can occur which results in undesirable wear whereby the life expectancy of the drive elements is considerably shortened.

The aim underlying the present invention essentially resides in providing an improved drive transmission arrangement for a stow roller train by virtue of which the control of the drive transmission is easier and more sensitive than in prior constructions. For this purpose, in accordance with one feature of the present invention, a positive or direct transmission arrangement is interposed between at least one intermediate roller and the drive means and/or between the at least one intermediate roller and the conveyor roller.

According to a further advantageous feature of the present invention, a first force transmission arrangement is provided between the intermediate rollers and the drive means and a second force transmission arrangement is provided between the intermediate rollers and the conveyor rollers with one of the force transmission arrangements being a positive or direct force transmission while the other force transmission arrangement is effected by a frictional contact.

One advantage of the present invention resides in the fact that the transmission of force no longer depends solely upon the existence of a frictional contact between the drive means, the intermediate rollers and the conveyor rollers but rather the application of transmission forces is applied by way of two differing force transmission means.

A further advantage of the present invention resides in the fact that with a positive or direct force transmission, such transmission is independent of uncontrollably changing friction conditions at the roller conveyors by virtue of differing loads thereon. Furthermore, the positive or direct engagement affords a reliable direct drive transmission.

In accordance with yet another feature of the present invention wherein a positive or direct transmission and a frictional contact transmission is provided, the friction surfaces are arranged so as to be moved perpendicularly toward and away from each other so that no clamping or other securing is required. By virtue of this arrangement, a release of the friction connection is readily accomplished by simply lifting off the intermediate rollers from the drive means and/or conveyor rollers.

Yet another andvantage of the present invention resides in the fact that by virtue of the arrangement of the force transmissions all transmissions loci are sturdy and have a relatively long life expectancy with the whole drive construction therefore being compactly assembled as a readily controlled unit which can easily be disposed in a protected location at the stow roller train so that contamination from dust, dampness, or from dry or wet materials being conveyed will be prevented.

Still another advantage of the present invention resides in the fact that by virtue of the transmission arrangement the functional reliability of the overall system is substantially increased by way of the positive drive with its capability of transmitting substantial forces. By virtue of the transmission arrangement of the present invention, a stow roller train can acceptably be utilized even for conveying heavy articles such as pallets in which the drive and control parts are normally subjected to considerable loads. Furthermore, the transmission arrangement of the present invention renders a stow roller train more readily utilizable in a multiplicity of situations.

Accordingly, it is an object of the present invention to provide a stow roller train construction which avoids the aforementioned shortcomings and drawbacks encountered in the prior art.

Another object of the present invention resides in providing a stow roller train which assures the existence of a sufficient force transmission between the drive means, intermediate rollers and conveyor rollers under all circumstances.

A further object of the present invention resides in providing a stow roller train which minimizes the occurrence of undesirable wear at the drive elements thereby increasing the life expectancy of such drive elements.

Still another object of the present invention resides in providing a stow roller train wherein the control of the drive transmission is easier and more sensitive than the control arrangements of the prior art constructions.

These and other objects, features, and advantages of the present invention will become more apparent from the following description when taken in connection with the accompanying drawing which shows, for the purposes of illustration only, two embodiments of a stow roller train in accordance with the present invention, and wherein:

FIG. 1 is a transverse cross-sectional view through a drive side of a stow roller train in accordance with the present invention;

FIG. 2 is a cross-sectional view taken along line II—II of FIG. 1;

FIG. 3 is a transverse cross-sectional view through a drive side of a second embodiment of a stow roller train in accordance with the present invention; and FIG. 4 is a cross-sectional view taken along line IV—IV of FIG. 3.

Referring now to the drawings wherein like reference numerals are used throughout the various views to designate like parts, and more particularly to FIGS. 1 and 2, according to these figures, a stow roller train is provided which includes spaced parallel longitudinally extending bearer members 1 preferably of a U-shaped cross-sectional configuration with each member being arranged such that the open sides thereof face inwardly or toward the center of the roller train. Conveyor rollers 2 are mounted on shafts 3, the respective ends of which are received in aligned bores provided in the spaced members 1 which bores are evenly distributed along the respective lengths of the members 1.

The conveyor rollers 2 support the individual articles and serve to convey such articles in the direction of the arrow 4. A drive element 5, in the form of a link, chain, toothed belt or the like, serves for driving the conveyor rollers 2 with the drive element being disposed about drive wheels (not shown) provided at the longitudinal extremeties of the roller train with at least one of the drive wheels being driven by a conventional motor (not shown) whereby the drive element is driven in the direction of the arrow 6. Profiled elements 7 and 17 are respectively disposed above and below the conveyor rollers 2 and the intermediate rollers 8 which profiled elements are fixed to the longitudinal bearer member 1 and function to support the return run and drive run of the drive element 5.

Intermediate rollers 8 are arranged between an upper side of the drive run of the drive element and the conveyor rollers 2 and serve to transmit a drive force from the drive element 5 to the respective conveyor rollers. Each of the intermediate rollers 8 is mounted on a stub or plug shaft 9 which in turn is mounted in a housing-like lever 10 with the respective intermediate rollers 8 being arranged upstream of their associated conveyor rollers 8 when viewed in the direction of conveyance 4. Each housing-like lever 10 is mounted so as to be pivotable about a shaft 11 mounted at the longitudinal member 1 with the shaft 11 being positioned above the stub shaft 9 and drive element 5. As seen in FIGS. 1 and 2, the shaft 11 and conveyor roller 2 are parallel so that the movement of the intermediate roller 8 is about an axis parallel to the conveyor roller 2 and above the drive element 5.

Preferably the conveyor rollers 2 are combined into roller groups with a sensor or feeler F being associated with each group and being pivotably mounted at the member 1. The sensor F extends beyond the rollers 2 into the path of motion of the articles and is pivoted by the articles from an upward driving position to a lowered release or idle position.

As schematically illustrated in FIG. 2, the feeler F is connected by way of an adjusting bar 14 which is provided with a plurality of spaced holes 16 for receiving pins 15 provided on each housing-like lever 10.

To permit independent adjustment of the intermediate rollers 8 with respect to the adjusting bar 14, the holes 16 have a large diameter than the diameter of the respective pins 15. A wider range of adjustability can be realized by fashioning the holes 16 as elongated slots. By virtue of the independent adjustability, the intermediate rollers 8 are automatically adjusted to accommodate varying load conditions. Specifically, with an increased resistance on the conveyor rollers 2 as a consequence of an increase of tensile force exerted positively on intermediate rollers 8 from the drive element 5, the intermediate rollers 8 will be urged more strongly against the conveyor rollers 2 so that the transmitted driving force will automatically be increased.

The pivotal mounting of the housing-like lever 10 at the member 1 and the interconnection of the lever 10 with the adjusting bar 14 permits the intermediate rollers 8 to be moved essentially parallel to the drive element 5 and at the same time be moved toward the shaft 3 of the conveyor rollers 2 so that the surfaces of the rollers 2 and the intermediate rollers 8 will be brought into engagement more or less perpendicularly so that a release or displacement of the intermediate rollers 8 from the driving position to the rest or idle position may occur by a simple lifting off of the contact surfaces of these elements.

A friction gear 12 and a toothed gear 13 are secured to each intermediate roller 8 with toothed gear 13 positively engaging the drive element 5 while in the rest or idle position with the friction gear 12 engaging the associated conveyor roller 2 when the adjusting bar 14 is displaced to the drive position.

To ensure against an overloading, each friction gear 12 includes a bearing cone 12' on which an elastic ring 12" is force fitted. Upon the occurrence of an excessive load, the bearing cone 12' and ring 12" are twisted with respect to each other so that a further damage or extreme wear to the ring 12" will be avoided.

In operation, the conveyed article pivots the sensor F and thereby displaces the adjusting bar 14 coupled thereto. The housing-like lever 10 and intermediate rollers 8 operatively connected to the adjusting bar 14 are pivoted in a counterclockwise direction as a result of the displacement of the adjusting bar 14 thereby resulting in the intermediate rollers 8 being displaced away from their associated conveyor rollers 2. After a release of the sensor 12 by the conveyed article, the sensor pivots upwardly resulting in a displacement of the adjusting bar 14 in the conveying direction. This latter displacement of the adjusting bar 14 results in the intermediate rollers 18 being pivoted in a clockwise direction by virtue of a drive force of the drive element and/or by a suitable spring means (not shown) biasing the adjusting bar in the conveying direction, and/or by gravity or the like.

As shown in FIGS. 3 and 4, the intermediate rollers may be fashioned as a single gear 18, which, in the drive position engages the drive element 5 and a further gear 19 coaxially fixedly secured to the associated conveyor roller 2. The gear 18 is mounted at one end of a lever 20, the other end of which is pivotally mounted about the shaft 3 of the conveyor rollers 2, with the shaft 3 being disposed approximately horizontally above the drive element 5. As shown in FIGS. 3 and 4, the shaft 3 and the conveyor roller 2 are parallel so that the movement of the intermediate roller 8 is about an axis which is parallel to the conveyor roller 2 and above the drive element 5. A further bipartite lever construction consisting of lever elements 21a, 21b is articulated to the stub shaft 9 with the other end of the lever construction being pivotably mounted about a pin 22 arranged at the member 1 above the drive element 5.

The adjusting bar 14 is connected with each of the intermediate rollers 8 of a roller group by way of a pivot pin 23 which articulates the adjacent ends of the lever elements 21a, 21b. As with the arrangement of FIGS. 1 and 2, the adjusting bar 14 is connected to a sensor (not shown), the displacement of which controls the positioning of the adjusting bar 14. As the sensor is pivoted downwardly by the conveyed articles, the adjusting bar 14 is moved to the right of FIG. 4 so that the gear 18 is lifted out of engagement with the drive elements almost perpendicularly thereto, as indicated by the phantom lines in FIG. 4. As apparent, upon the sensor being pivoted upwardly, the adjusting bar 14 will be displaced to the left of FIG. 1 thereby causing engagement of the gear 18 with the gear 19 and the drive element 5. The leftward displacement of the adjusting bar 14 may be effected by gravity or by a suitable spring construction (not shown) operatively connected with the adjusting bar 14.

To protect against excessive bending of the lever elements 21a, 21b in the drive position, a step or angularly bent portion 24 is arranged on the lever element 21a which, in the drive position, is urged against an edge of the lever 21b thereby establishing a rigid connection between the lever elements 21a, 21b whereby the gear 18 is in positive engagement with the drive element 5.

To further enhance the drive transmission effect of the present invention, two toothed gears 18 could be provided rather than a single gear and also a friction contact transmission could be established between the intermediate rollers 8 and the drive element 5. Additionally, in lieu of a link or chain type drive element 5, a reciprocating rack could be provided; however, at least in the exclusively positive transmission area there would have to be an override coupling arrangement to make return of the rack possible without affecting the conveyor rollers 2. Furthermore, as a security against an overloading, release couplings may be provided between the friction gear 12 and the gear 13 of the intermediate rollers 8, or between conveyor rollers 2 and the gear 19.

While I have shown and described only two embodiments in connection with the above-identified application, it is understood that the same is not limited thereto but is susceptible of numerous changes and modifications as known to one skilled in the art and I therefore do not wish to be limited to the details shown and described herein but intend to cover all such changes and modifications as are encompassed by the scope of the appended claims.

I claim:

1. A stow roller train arrangement which includes a plurality of rotatably mounted conveyor roller means disposed transversely of a conveying direction, a conveyor roller means drive means, and intermediate roller means associated with each conveyor roller means for transmitting a drive force from the drive means to the conveyor roller means, characterized in that a positive drive transmission is provided at the drive force transmission occurring between the drive means and the intermediate roller means and the drive force transmission occurring between the intermediate roller means and the conveyor roller means and a mounting means is provided to mount said intermediate roller means for movement to and from a drive position and an idle position, said movement of each of the intermediate roller means being about an axis parallel to the conveyor roller means and above the conveyor roller means drive means and further characterized in that a means is provided for interconnecting a plurality of intermediate roller means and means are connected to said interconnecting means for selectively displacing said interconnecting means and said intermediate roller means to and from said drive position and said idle position in response to the presence or absence of articles at said displacing means, and wherein said positive drive transmission includes a gear means securely mounted on each of said intermediate roller means, a further gear means securely mounted to each conveyor roller means, said gear means and said further gear means being respectively engageable with said drive means and with each other when said interconnecting means are displaced by said displacing means into the drive position, and wherein said mounting means for mounting each of the intermediate roller means includes a pivot means for mounting said intermediate roller means so as to be pivotable about an associated conveyor roller means, and wherein said mounting means further includes a first lever means having a first end pivotally connected to an associated conveyor roller means, a second lever means having a first end pivotally connected to a second end of said first lever means, an intermediate roller means being arranged at said first end of said second lever means, and in that means are provided for pivotally connecting a second end of said second lever means at said interconnecting means such that said gear means is brought into and out of engagement with the drive means in a substantially perpendicular manner.

2. A stow roller train arrangement which includes a plurality of rotatably mounted conveyor roller means disposed transversely of a conveying direction, a conveyor roller means drive means, and intermediate roller means associated with each conveyor roller means for transmitting a drive force from the drive means to the conveyor roller means, characterized in that a positive drive transmission is provided between the drive means and the intermediate roller means and between the intermediate roller means and the conveyor roller means, a means is provided for interconnecting a plurality of intermediate roller means, means are connected to said interconnecting means for selectively displacing said interconnecting means and said intermediate roller means to and from a drive position and idle position in response to the presence or absence of articles at said displacing means, the positive drive transmission includes a gear means securely mounted on each of said intermediate roller means, a further gear means securely mounted to each conveyor roller means, said gear means and said further gear means being respectively engageable with said drive means and with each other when said interconnecting means are displaced by said displacing means into the drive position, means are provided for mounting each of said intermediate roller means so as to be pivotable about an associated conveyor roller means, said mounting means includes a first lever means having a first end pivotally connected to an associated conveyor roller means, a second lever means having a first end pivotally connected to a second end of said first lever means, an intermediate roller means being arranged at said first end of said second lever means, and a second end of said second lever means is pivotally mounted at said interconnecting means such that said gear means is brought into and out of engagement with the drive means in a substantially perpendicular manner, and in that said second lever means consists of two, lever elements with a pivot means being arranged between the first and second ends of said second lever means for articulatingly connecting said lever elements to each other and to said interconnecting means.

3. An arrangement according to claim 2, characterized in that a pair of spaced longitudinally extending bearer means are provided for mounting at least the intermediate roller means and the drive means.

4. An arrangement according to claim 3, characterized in that means are provided at one of said bearer means for supporting the drive means at a position below the intermediate roller means.

5. An arrangement according to claim 4, characterized in that means are provided at one of said bearer means for supporting said drive means at a position above the conveyor roller means.

6. An arrangement according to claim 3, characterized in that each of said bearer means has a U-shaped cross-sectional configuration with the open side of each facing inwardly toward the center of the roller train.

* * * * *